United States Patent [19]
Kozlov et al.

[11] 3,802,562
[45] Apr. 9, 1974

[54] DISTRIBUTOR OF DIALYZING SOLUTION

[76] Inventors: Jury Gotlibovich Kozlov, Khoroshovskoe shosse, II, kv. 47; Adolf Iserovich Khaltlin, Bolshevistsky per. 13/3, kv. 13; Konstantinovna Lisitsina, ulitsa Molodtsova, 9, kv. 7, all of Moscow, U.S.S.R.

[22] Filed: Apr. 7, 1972

[21] Appl. No.: 241,928

[52] U.S. Cl. ................................. 210/96, 210/321
[51] Int. Cl. ............................................. B01d 13/00
[58] Field of Search ............ 55/18, 67; 73/38, 41.5, 73/42; 137/93, 110; 210/22, 96, 253, 321

[56] References Cited
UNITED STATES PATENTS

| | | | |
|---|---|---|---|
| 3,352,779 | 11/1967 | Austin et al. | 210/96 X |
| 2,454,124 | 11/1948 | Birsch et al. | 210/253 |
| 2,819,608 | 1/1958 | McLaren et al. | 73/38 |
| 3,022,858 | 2/1962 | Tillyer et al. | 55/18 X |
| 3,598,727 | 8/1971 | Willock | 210/22 |

Primary Examiner—John Adee
Assistant Examiner—Robert H. Spitzer
Attorney, Agent, or Firm—Waters, Roditi, Schwartz & Nissen

[57] ABSTRACT

A distributor of dialyzing solution comprising a feed tank connected with the inlets of the dialyzers through an analyzer of solution transparency and a vacuum pump connected with the dialyzer outlets through valves. The distributor has another analyzer of solution transparency whose inlet is connected through valves to the outlets of the dialyzers, while its outlet is connected with the vacuum pump, as a result of which the second analyzer of solution transparency can be connected alternately to each dialyzer in the group.

1 Claim, 1 Drawing Figure

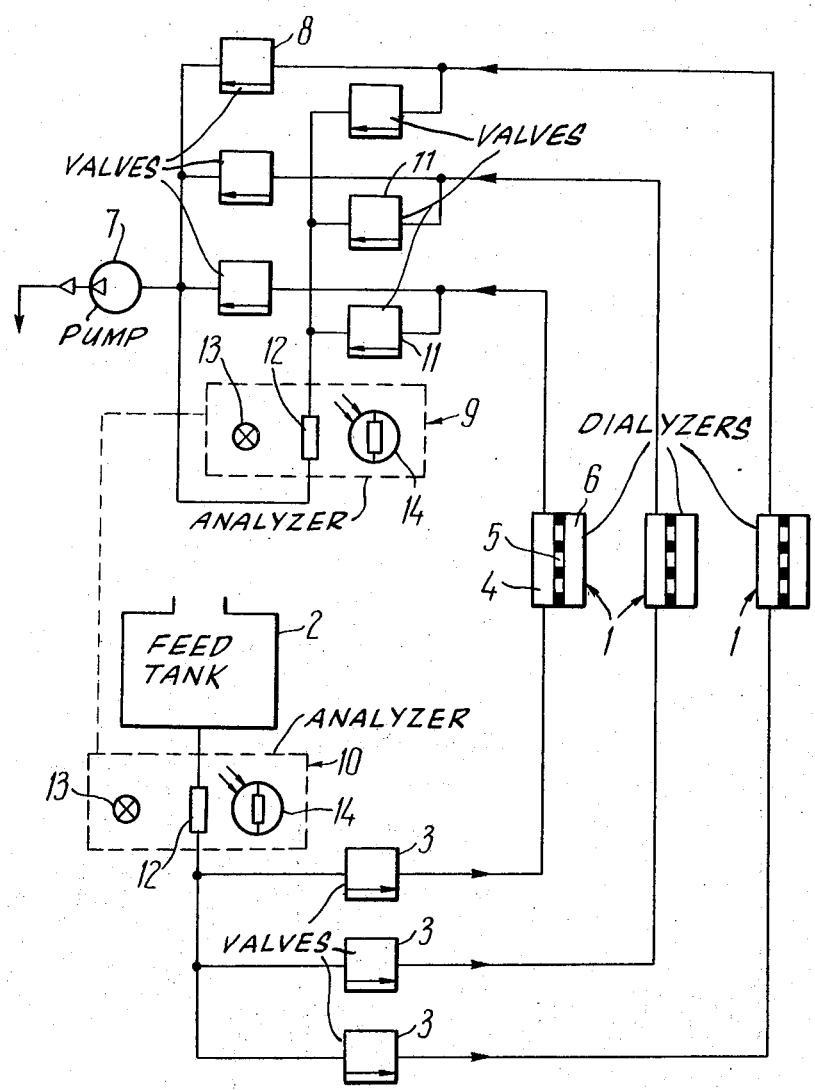

DISTRIBUTOR OF DIALYZING SOLUTION

The invention relates to devices for distributing a dialyzing solution in apparatus for removing toxic substances and excess water from the blood of patients (e.g. artificial kidney apparatus) and intended to feed a group of dialyzers while simultaneously controlling the changes in the transparency of a spent dialyzing solution by comparing it with a fresh one to detect any possible oozing of the blood into the dialyzing solution.

Blood can penetrate through a semipermeable membrane of the dialyzer and thus contaminate the dialyzing solution. Timely detection of blood in the solution is a prerequisite condition for a successful and safe operation of hemodialysis in patients with acute and chronic renal insufficiency.

Distributors of the dialyzing solution are known in prior art, for example a distributor employed in the renal center of the firm "Sweden" (Sweden-Seattle hemodialyzer; catalogue No.SK200 of Sweden-Seattle company, USA), comprising a feed tank, connected with the inlets of the dialyzers and a vacuum pump connected with the dialyzer outlets, and also analyzers of the transparency of the dialyzing solution installed at the inlet and the outlet of the dialyzers, the outlet of each dialyzer being equipped with such an analyzer of the solution transparency. The transparency of the dialyzing solution at the dialyzer outlet is compared photometrically with the transparency of the fresh solution. Each analyzer of the solution transparency consists of a tube, through which the dialyzing solution moves, a source of light and a photocell, all arranged along the same optical axis. If the solutions at the inlet and the outlet of the dialyzer have the same transparency, light of equal intensity is incident upon the photosensitive elements, as a result of which no signal is produced at the outlet of a balanced measuring circuit incorporating the sensitive elements. If, however, the solution at the dialyzer outlet becomes contaminated with the blood, the intensity of the light beam incident on the respective photosensitive element diminishes and the resistance of the element changes to bring the circuit out of balance and to produce a signal. When the magnitude of the signal exceeds a preset level, the dialyzer is switched off to prevent further penetration of the blood into the dialyzing solution.

The disadvantage of the known distributors of the dialyzing solution is that the design of the apparatus is very complicated since it incorporates analyzers of solution transparency in each dialyzer. Hence the insufficient safety and reliability of the apparatus as a whole. Moreover, servicing of the apparatus is also complicated, since the analyzers require special adjustment and periodical cleaning.

The object of this invention is to eliminate these disadvantages and to provide a distributor of a dialyzing solution which is simple in design, reliable in operation and easy to maintain.

The object of the invention has been attained in a distributor of dialyzing solution intended to feed a group of dialyzers with simultaneous control of the changes in the transparency of the spent dialyzing solution by comparing it with fresh solution, and containing a feed tank communicating with the dialyzer inlets, a vacuum pump connected with the dialyzer outlets, and also analyzers of solution transparency installed at the inlet and the outlet from the dialyzers, in which according to the invention the outlet of each dialyzer is connected through the agency of a valve with the inlet of the said vacuum pump, while the other valve connects the outlet of each dialyzer with the inlet of a common analyzer of solution transparency whose outlet is connected with the inlet of the said vacuum pump so that the analyzer of solution transparency can be connected alternately to the outlet of each dialyzer.

The employment of only one analyzer of solution transparency at the outlet of a group of dialyzers simplifies the design of the distributor of the dialyzing solution and improves its reliability. At the same time, the servicing of the distributor is also simplified, since the time required to adjust the analyzers and to clean them is reduced considerably.

For a better understanding of the invention it will be described with reference to an exemplary embodiment and with reference to the appended drawing in which the sole FIGURE schematically shows the distributor of dialyzing solution according to the invention.

Referring to the drawing, therein is seen a distributor for a dialyzing solution intended for feeding a group of dialyzers 1 with simultaneous control of transparency of the spent dialyzing solution by comparing it with fresh solution, and the distributor comprises a feed tank 2, connected through valves 3 with inlets of chambers 4 of each dialyzer 1 intended to hold the dialyzing solution and separated with semipermeable membranes 5 from blood chambers 6 through which the blood of the patient is passed. The distributor of the dialyzing solution contains also a vacuum pump 7, connected with the outlets of chambers 4 of the dialyzers 1 through valves 8, and also analyzers of solution transparency 9 and 10. The inlet of the analyzer 9 is connected through valves 11 with the outlets of chambers 4 of the dialyzers 1, while the inlet of the analyzer 9 of the solution transparency is connected with the vacuum pump 7. The inlet of the analyzer 10 of solution transparency is connected with the feed tank 2, while its outlet is connected through valves 3 with the chambers 4 of the dialyzers 1.

Each analyzer (9 or 10) of solution transparency consists of a transparent tube 12, source of light 13 and a receiver of light 14.

The distributor of dialyzing solution operates as follows:

From the feed tank 2 the dialyzing solution is delivered into the inlets of the chambers 4 of the dialyzers 1 through the tube 12 of the analyzer 10 of solution transparency and valves 3.

From the outlets of chambers 4 of the dialyzers 1, the spent solution is delivered through the valves 8 into the vacuum pump 7 and drained off. The solution is passed through the dialyzers 1 by the action of the vacuum pump 7.

An automatic switch (not shown in the drawing) operates alternately the valve 8 in each dialyzer to close it and to open the valve 11, as a result of which the solution from the dialyzer outlet is passed through the valve 11 and the tube 12 of the analyzer 9 of solution transparency. The analyzer 9 compares the transparency of the solution at the outlet of the dialyzer 1 with the transparency of the solution at the inlet to the dialyzer (determined by the analyzer 10). As the transparency of the outcoming solution diminishes below the permissible level due to penetration of the blood into the dialyzing solution through a damaged membrane 5, the valves 3, 8, and 11 are closed automatically, and the faulty dialyzer is disconnected from the feeding tank 1 and the vacuum pump 7.

The use of the proposed distributor of dialyzing solution reduces the number of analyzers of solution transparency required to ensure the control of blood penetration into the dialyzing solution with the simultaneous operation of a group of dialyzers.

We claim:

1. A distributor of dialyzing solution for feeding a plurality of dialyzers while simultaneously controlling transparency change of spent solution by comparing with fresh solution, said distributor comprising; a feed tank, a first analyzer of solution transparency, means including a first group of valves connecting the first analyzer with the dialyzers for selectively and individually connecting said first analyzer to said dialyzers, a vacuum pump, means including a second group of valves connecting said dialyzers with said vacuum pump for selectively and individually connecting said dialyzers to said vacuum pump, a second solution transparency analyzer, means coupling said first and second analyzers for enabling comparison of the transparency of the solution at the inlet of the second analyzer with the transparency of the solution at the inlet of the first analyzer, and means including a third group of valves connecting said dialyzers to the second solution transparency analyzer with said vacuum pump for selectively connecting the second solution transparency analyzer through any selected one of the third group of valves to each of said dialyzers.

* * * * *